United States Patent
Weber et al.

(10) Patent No.: US 10,112,644 B2
(45) Date of Patent: Oct. 30, 2018

(54) METHOD FOR OPERATING A STEERING SYSTEM

(71) Applicant: Robert Bosch Automotive Steering GmbH, Schwäbisch Gmünd (DE)

(72) Inventors: Markus Weber, Göppingen (DE); Timo Irtenkauf, Schwäbisch Gmünd (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 212 days.

(21) Appl. No.: 15/121,093

(22) PCT Filed: Jan. 14, 2015

(86) PCT No.: PCT/EP2015/050552
§ 371 (c)(1),
(2) Date: Aug. 24, 2016

(87) PCT Pub. No.: WO2015/128110
PCT Pub. Date: Sep. 3, 2015

(65) Prior Publication Data
US 2016/0368532 A1  Dec. 22, 2016

(30) Foreign Application Priority Data
Feb. 25, 2014 (DE) ........................ 10 2014 102 424

(51) Int. Cl.
*B62D 5/04* (2006.01)
(52) U.S. Cl.
CPC ......... *B62D 5/0472* (2013.01); *B62D 5/0421* (2013.01); *B62D 5/0484* (2013.01); *B62D 5/0493* (2013.01)

(58) Field of Classification Search
CPC .. B62D 5/0484; B62D 5/0493; B62D 5/0421; B62D 5/0472
See application file for complete search history.

(56) References Cited

U.S. PATENT DOCUMENTS

| | | | |
|---|---|---|---|
| 6,373,217 B1* | 4/2002 | Kawada | B62D 5/0463 180/443 |
| 2008/0017439 A1* | 1/2008 | Sawada | B62D 5/0472 180/446 |
| 2009/0120714 A1* | 5/2009 | Hisanaga | B62D 5/046 180/446 |

FOREIGN PATENT DOCUMENTS

| | | |
|---|---|---|
| DE | 102004028827 | 1/2006 |
| DE | 102006041236 | 3/2008 |
| JP | 2005153709 A * | 6/2005 |

(Continued)

OTHER PUBLICATIONS

International Search Report for Application No. PCT/EP2015/050552 dated Apr. 8, 2015 (English Translation, 3 pages).

*Primary Examiner* — Thomas G Black
*Assistant Examiner* — Ce Li Li
(74) *Attorney, Agent, or Firm* — Michael Best & Friedrich LLP (57) ABSTRACT

Described is a method for operating a steering system (4) in a motor vehicle, said steering system (4) comprising an electric drive unit (15) for boosting the steering force. The electric drive unit (15) is operated using software. When the software is restarted, the drive unit (15) is operated in such a way that a torque introduced into the drive unit (15) is damped.

15 Claims, 5 Drawing Sheets

(56) References Cited

FOREIGN PATENT DOCUMENTS

WO 2008038006 4/2008

* cited by examiner

METHOD FOR OPERATING A STEERING SYSTEM

BACKGROUND OF THE INVENTION

The invention relates to a method for operating a steering system of a motor vehicle having an electric drive unit for boosting the steering force.

It is known that steering systems are operated using software which runs on a control device. Likewise, it is known that software errors have to be dealt with in order to prevent a faulty function of the steering system.

DE 10 2004 028 827 A1 discloses a method for operating a steering system in which a plurality of system states are used. These system states comprise, for example, the initialization of the steering system, the partial provision of the functionality of the useful applications of the steering system, the provision of the functionality of kinematic useful applications of the steering system, a fault mode and deactivation.

As a result of the increased market penetration of electromechanic steering systems, the requirements made of the availability of these systems are also increasing.

SUMMARY OF THE INVENTION

The problem on which the invention is based is solved by a method. In addition, features which are important for the invention can be found in the following description and in the drawings, wherein the features can be important for the invention either in isolation or else in different combinations, without this being explicitly referred to again.

In the method according to the invention, during a restart of the software for operating a drive unit the drive unit is operated in such a way that the torque which is introduced into the drive unit is damped.

The driver of the vehicle and the underlying surface influence the torque which is introduced into the drive unit via the steering system during the restart of the software. By damping the torque which is introduced into the driving unit, a time period without server assistance calculated by means of software can be spanned in such a way that no significant adverse effect occurs for the driver of the vehicle while the driving situation is being dealt with. In this context, it is necessary to bear in mind, in particular, that the human reaction time, that is to say the time period starting with a suddenly occurring event and an action which is triggered by the person usually lasts for approximately 1.5 to 2 seconds. If the person expects the event, the reaction time can be reduced to approximately 500 ms. The duration of software failure of the steering system and a restart of the software which is associated therewith currently requires at least 200 ms.

Furthermore, what is referred to as a kick-back effect can be avoided by means of the method according to the invention. During the restart of the software, the drive unit would have no power, as a result of which the drive unit would not have any influence on the steering movement of the steering system. The kick-back effect would arise as a result of a servo torque being lost at or during the restart of the software. This can give rise to a steering situation which confuses the driver of the vehicle, since during the restart of the software the steering wheel can be moved without servo assistance. Furthermore, the inventive damping of the introduced torque does not give rise to absolute blocking of the rotational movement but instead merely ensures that the steering position is briefly held in a damped fashion.

The method according to the invention merely provides the driver of the vehicle with mechanical feedback at the steering wheel, which feedback corresponds to traveling over an uneven part of the surface. Therefore, when an essentially constant torque is applied or input by the driver the position of the drive unit and therefore that of the steering wheel is essentially maintained. When a torque which is changed over time is applied by the driver, the rotational speed of the electric drive unit and the rotational speed of the steering wheel during the restart of the software can be advantageously reduced by means of the proposed damping.

In one advantageous embodiment of the method, during the restart of the software a short-circuit is produced between at least two drive phases of the drive unit. A torque which is introduced into the drive unit can therefore be counteracted easily.

In one advantageous embodiment, the degree of damping is adjusted using a pulse-width-modulated signal. Adaptation to a respective type of vehicle can therefore be achieved.

A further advantageous embodiment of the method provides that the pulse-width-modulated signal is determined as a function of a state which exists before or during the detection of the software error. As a result, the spanning of the restart phase of the software can be adapted to the respective driving situation and steering situation. Therefore, the operation of the electric drive unit during the restart can be adapted to the driving situation which was present before the second time period.

In a further advantageous embodiment, during the restart of the software, no damping of the torque which is introduced into the drive unit is carried out for a rotational speed of the drive unit which is above a threshold value and is present before the restart of the software. Therefore, a restart can also be carried out in steering situations in which a strong steering movement is carried out. As a result of the fact that no damping is carried out during this strong steering movement, driving safety can be improved, since the steering request in the sense of a strong steering movement is not counteracted by the damping.

In one advantageous embodiment, during a starting mode of the steering system, in particular of the motor vehicle, the software is started during a first time period. During a driving mode of the motor vehicle, a faulty function of the software is detected. The software is restarted during a second time period as a function of the detection of the faulty function of the software, in such a way that the second time period is shorter than the first time period. This provides a method which substantially increases the availability of the electromechanical steering system. As a result of the shortened, second time period, the mechanical fall back level is advantageously used only briefly in order to operate the steering system with servo assistance again as quickly as possible.

In one advantageous embodiment, the system is changed into a limp-home mode which ensures safe driving with power steering assistance even in the case of a reduced functional scope of the steering system.

In one advantageous embodiment, during the limp-home mode the torque is reduced compared to a normal mode by a factor, in order, on the one hand, to avoid damage as a result of faulty functioning of the software, and in order to alert the driver, by means of the reduced torque, to the particular driving situation and therefore cause the driver to drive cautiously. Furthermore, in limp-home mode compared to the normal mode fewer software functions, for example comfort functions, are active, as a result of which incorrect influences, in particular arising from the switched-off software functions, can be eliminated.

BRIEF DESCRIPTION OF THE DRAWINGS

Further features, application possibilities and advantages of the invention emerge from the following description of exemplary embodiments of the invention which are illustrated in the figures of the drawing. In this context, all of the features which are described or presented form, per se or in any desired combination, the subject matter of the invention, independently of their combination in the patent claims or their back references as well as independently of their formulation or presentation in the description or in the drawing. In all the figures, the same reference symbols are used for functionally equivalent variables, even for different embodiments in some cases.

Exemplary embodiments of the invention will be explained below with reference to the drawing, in which.

DETAILED DESCRIPTION

Figure 1:
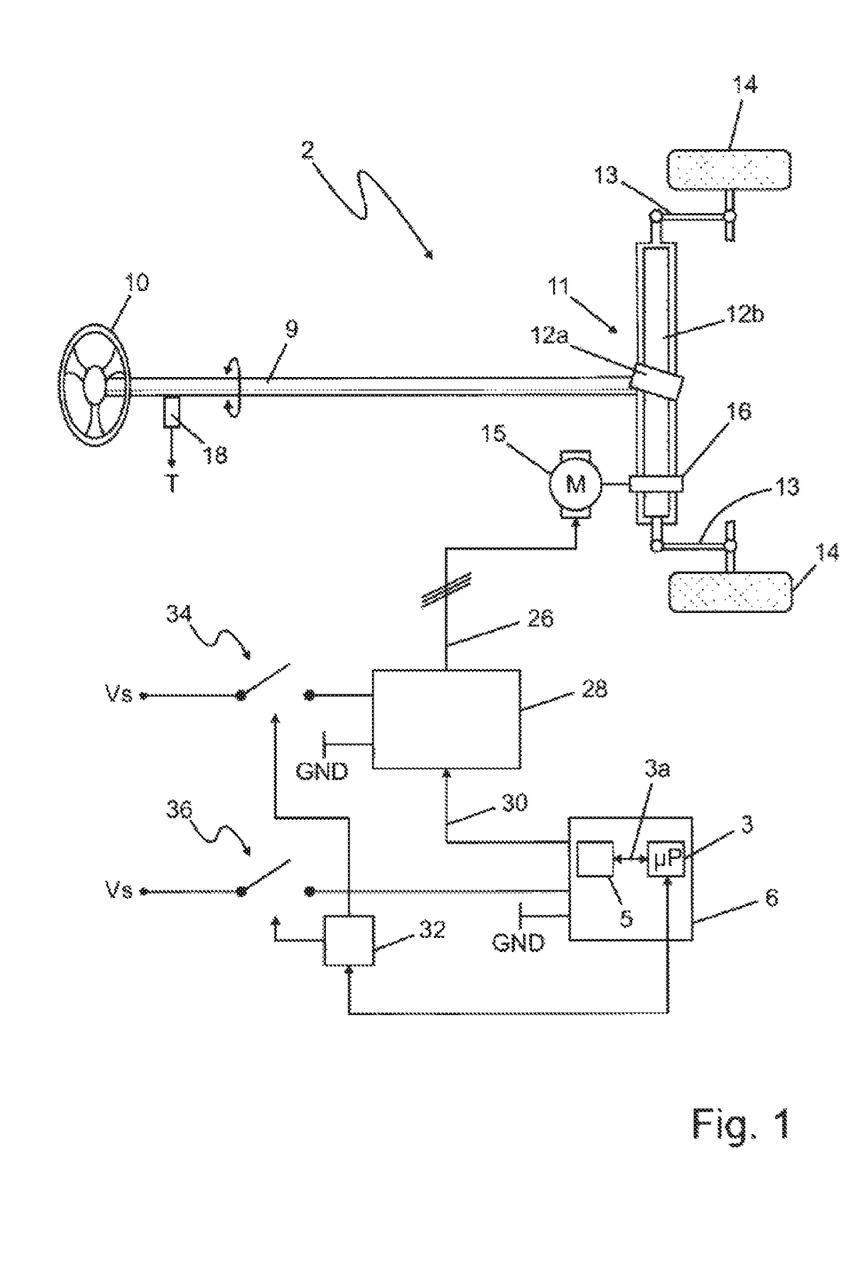
FIG. 1 shows by way of example a schematic view of a steering system.

FIG. 1 illustrates an open-loop and/or closed-loop control apparatus which is referred to as a control device 6 and is assigned to a steering system 2. The steering system 2 is also referred to as a steering device. A computer (for example microcomputer or microcontroller) with a processor 3 is arranged in the control device 6, wherein the processor 3 is connected via a data line 3a, for example a bus system, to a memory element 5. The methods described here can be embodied, in particular, as a computer program for a digital computing unit such as the processor 3. A computer program for carrying out the method can run on the digital computing unit 3. Furthermore, the computer program can be stored on the memory element 5 for the control device 6 of the steering system 2. The control device 6 is connected via power electronics 28 to an electric drive unit 15 for providing power assisted steering for boosting the steering force, as a result of which open-loop and/or closed-loop control of the electric drive unit 15 by the control device 6 is made possible. The electric drive unit 15 is embodied, for example, as an electric motor and acts on a steering rack 12b via a gear 16. A steering means 10, for example a steering wheel by means of which a torque can be applied to a torsion bar 9 by a driver by actuating the steering means 10, is arranged on said torsion bar 9.

The steering device 2 also has a steering gear mechanism 11 which is embodied, for example, as a rack-and-pinion steering system. The steering gear mechanism 11 can, however, also be embodied as a recirculating ball gear mechanism or as a ball-and-nut gear mechanism. In the following description, a rack-and-pinion steering system is mainly assumed, wherein the steering gear mechanism comprises a pinion 12a and the steering rack 12b. However, the type of steering system is irrelevant for the invention. Instead of being implemented as a rack-and-pinion system, the steering device 2 as shown in FIG. 1 could be implemented, for example, as a ball-and-nut steering system or as a single wheel steering system. The steering gear mechanism 11 is connected via the pinion 12a and the steering rack 12b to a steering linkage 13 on each side of the vehicle, which steering linkage 13 interacts with a wheel 14. Of course, alternatively or additionally to the arrangement of the gear mechanism 11 on the torsion bar 9, the electric drive unit 15 can also have a further drive which has a mechanical operative connection to the steering rack 12b via a further gear mechanism. Of course, the drive unit 15 which is shown can also be operatively connected to the steering rack 12b via the pinion 12a.

The steering device 2 which is illustrated in FIG. 1 therefore constitutes one of a multiplicity of possible embodiments of steering devices which are suitable for carrying out the method according to the invention. Accordingly, the motor 15 of the power steering system can also be arranged in such a way that it acts, together with the torsion bar 9, on the pinion 12a which is arranged in the steering gear mechanism 11 or else acts directly—by means of a further pinion—on the steering rack 12b.

The electric drive unit 15 is operated with electrical energy which is fed to the electric drive unit 15 via a line 26 which has three phases. The power electronics 28 are connected for this purpose to an energy supply with the supply voltage Vs and operated by the control device 6 by means of signals 30.

The processor 3 is monitored by means of a monitoring unit 32. The monitoring unit 32 transmits inquiry messages to the computing unit 3 and expects correct response messages. The monitoring unit 32 increments or decrements a fault counter in the event of a response message which deviates from the correct response message. The monitoring unit 32 disconnects the electric drive unit 15 from a supply voltage Vs or from a power supply by means of the power electronics 28 and/or the computing unit 3, or disconnects the control unit 6 from a supply voltage Vs or from a power supply by means of the switches 34 and/or 36, when a threshold value is reached by the fault counter.

Furthermore, the steering system 2 comprises a sensor 18 on the torsion bar 9 by means of which a measurement signal T can be determined and fed to the control device 6. Of course, further measurement signals (not shown) can also be fed to the control device 6. As a function of these measurement signals, the control device 6 determines the signal 30 for boosting the steering force.

Figure 2:
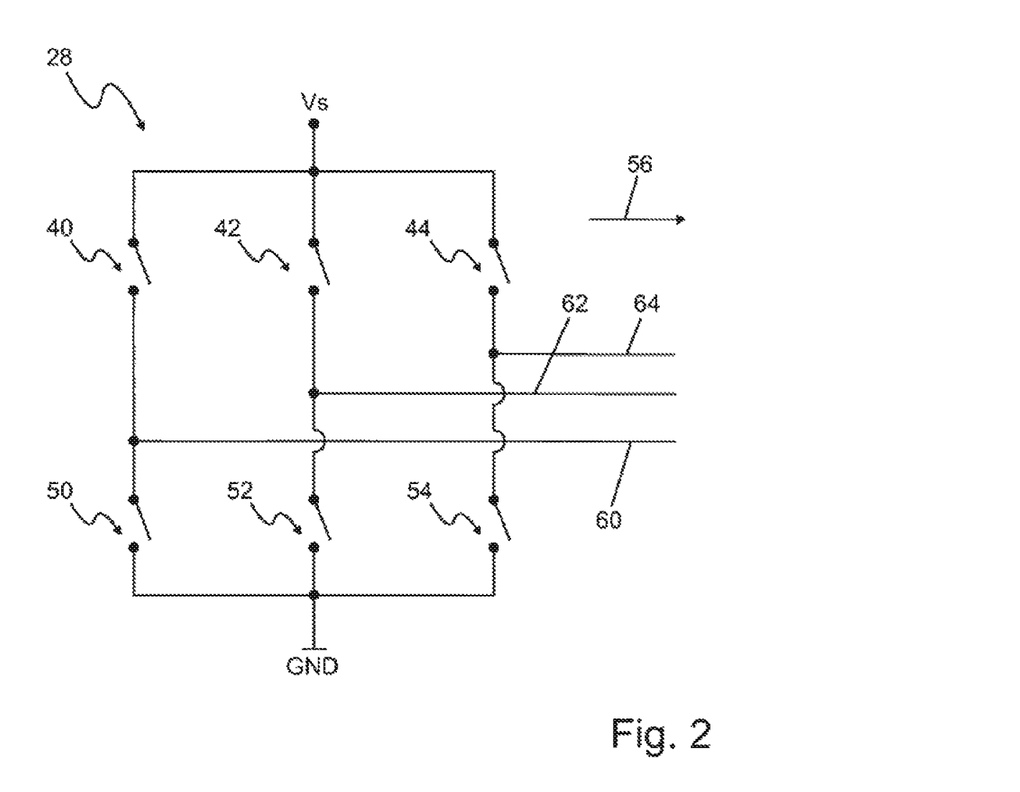
FIG. 2 shows a schematic view of power electronics for operating an electric drive unit.

FIG. 2 shows the power electronics 28 from FIG. 1 in an exemplary form. Of course, other means of actuation can also be used for operating the electric drive unit 15. The power electronics 28 comprise three switches 40, 42 and 44 which are connected to a supply voltage Vs. Furthermore, the power electronics 28 comprise three switches 50, 52 and 54 which are connected to the ground GND. The electric drive unit 15 is arranged in the direction of the arrow 56 and connected to the line 26. The switches 40 and 50 are connected to a first phase 60. The switches 42 and 52 are connected to a second phase 62. The switches 44 and 54 are connected to a third phase 64. The phases 60 to 64 form the line 26. The switches 40 to 44 and 50 to 54 are operated as a function of the signals 30, coming from the control device 6. The open position which is shown for the switches 40 to 54 is merely exemplary. The switches 40 to 54 are opened or closed by means of the signals 30, in order to generate on the line 30 a three-phase alternating current for operating the electric drive unit 15.

Figure 3:
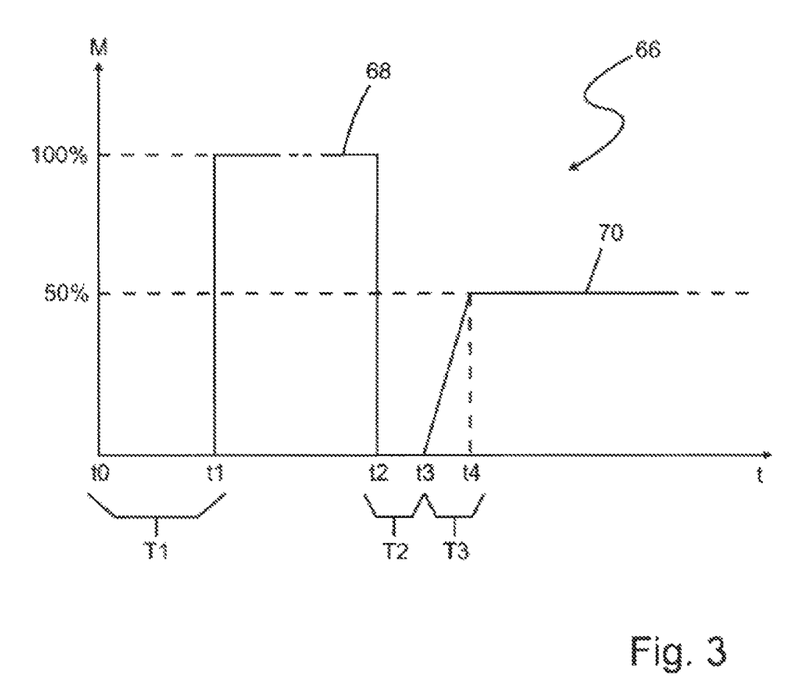
FIG. 3 shows a schematic torque/time diagram.

FIG. 3 shows a schematic view of a torque/time diagram 66. During a first time period T1 which extends from the time t0 to a time t1, a cold boot is carried out. After the time t1, the system changes into a normal mode. During the normal mode, the electric drive unit 15 is operated in such a way that according to the profile 68 100% of the torque M, corresponding to the respective drive situation can always be introduced into the steering system 2 by means of the drive unit 15. The 100% of the torque corresponds, for example, to a factor of 1, which can be multiplied by the torque M corresponding to the drive situation. A factor of less than one, for example less than or equal to 0.5, which can be multiplied with the torque M corresponding to the drive situation, is correspondingly selected for the limp-home mode.

A faulty function of the software which is executed on the control device 6 by the processor unit 3 is detected at the time t2. The software is deactivated by the detection of the faulty function, which results in the boosting of the steering force by the electric drive unit 15 being eliminated. Consequently, the available boosting of the steering force drops to 0% according to the profile 68.

During the second time period T2, which is also referred to as a failure time period and which extends from the time t2 to the time t3, the steering system is without boosting of the steering force. This means that the mechanical fall back level of the steering system 4 is used in order to steer the motor vehicle during the second time period T2.

At the time t3, the system is changed into a limp-home mode which has a smaller functional scope than the normal mode of the steering system 2. Furthermore, in the limp-home mode the torque is reduced compared to the normal mode. During a third time period T3 extending from the time t3 to the time t4, ramping in of the torque occurs, in order to prevent sudden jumps in the torque. This occurs, for example, by virtue of the fact that a factor of 0 to 0.5 for multiplication with the torque to be generated is increased from the time t3 to the time t4. The profile 70 therefore represents the limp-home mode. In the limp-home mode, the driver of the vehicle can be informed, for example by the lighting up of a warning lamp, that the motor vehicle has to be taken to a workshop for maintenance.

Within the second time period T2, the electric drive unit 15 is operated in such a way that a torque which is introduced into the electric drive unit 15 is damped. The damping of the torque which is introduced means that a torque which is introduced by the driver during the second time period T2 is counteracted by the corresponding operation of the electric drive unit 15. Of course, the driving situation and steering situation, in conjunction with the underlying surface, also influences torque which is introduced. Consequently, the damping of the torque which is introduced into the drive unit 15 generally means operation of the drive unit 15, with the result that the drive unit 15 generates a torque which goes beyond a torque generated by the idling of the drive unit 15 and is opposed to the torque which is introduced. When a torque which is changed over time is applied by the driver, the rotational speed of the steering wheel is at least briefly reduced by means of the electric drive unit 15 during the time period T2 by damping it.

During the time period T2, in a first embodiment one of the switches 50, 52 and 54 is closed. In a second embodiment, two of the switches 50, 52 and 54 are closed. In a further third embodiment, all three switches 50, 52 and 54 are closed.

In a fourth embodiment, two of the switches 50, 52 and 54 remain opened and one of the switches 50, 52 and 54 is operated as a function of a pulse-width-modulated signal.

In a fifth embodiment, one of the switches 50, 52 and 54 remains opened and two of the switches 50, 52 and 54 are opened or closed as a function of a pulse-width-modulated signal.

In a sixth embodiment, all three switches 50, 52 and 54 are opened are closed as a function of a pulse-width-modulated signal. Of course, pulse-width-modulated signals with different pulse lengths can also be fed to the individual switches 50 to 54.

Of course, instead of the switches 50 to 54 the switches 40 to 44 can also be operated according to the abovementioned embodiments, wherein the switches 50 to 54 are opened.

During the time period T2, the software is not active, for which reason in one embodiment the state of the switches 40 to 54 is still fixed for the time period T2 during the normal driving mode before and at the start of the time period T2.

In the case of a pulse-width-modulated signal, the latter is generated by a pulse width unit during the time period T2, which unit is preferably embodied using hardware. The parameters for the modulating of the pulse width, in particular the duty cycle and/or pulse width are still determined by the software before the start of the time period T2 as a function of the rotational speed of the drive unit 15 and are stored in a register. The register can be read out by the other unit at the start and during the time period T2, in order to carry out the pulse width modulation during the time period T2. Consequently, the duty cycle and/or pulse width can be determined as a function of a state before or when the software fault is detected. The further unit is, in particular, a timer module which is embodied using hardware.

The monitoring unit 32 is operated at the start of the second time period T2 and/or during the second time period T2 and/or as a function of the detection of the faulty function of the software in such a way that the probability of the monitoring unit 32 disconnecting the electric drive unit 15 and/or the computing unit 3 and therefore the control device 6 in the power supply during the second time period T2 is reduced. For this purpose, the frequency of the inquiry messages is increased by the monitoring unit 32 and/or the frequency of the response messages to the monitoring unit 32 is increased at the start of the second time period T2 and/or during the second time period T2 and/or as a function of the detection of the faulty function in the software.

Figure 4:
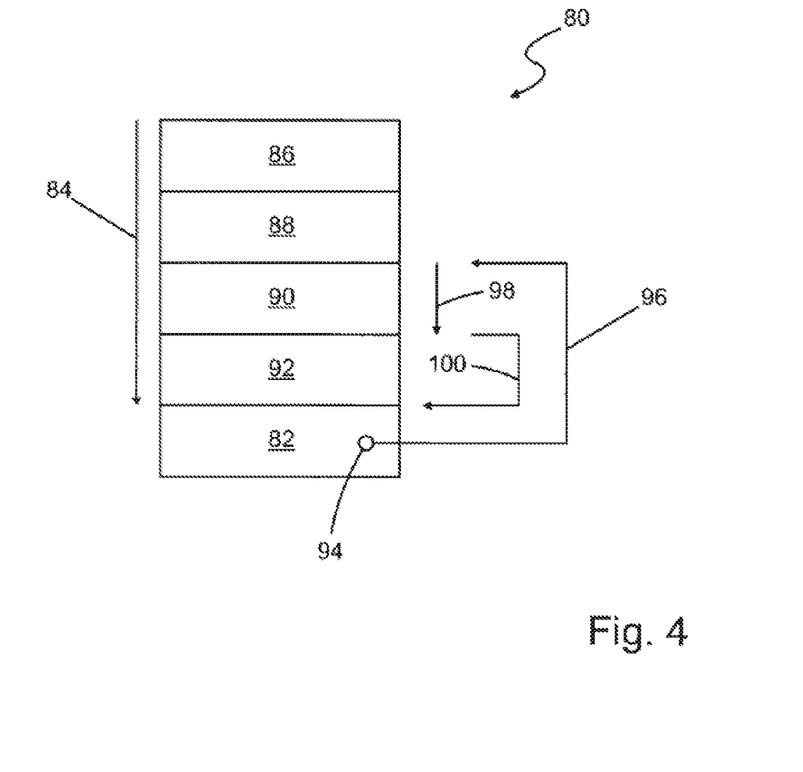
FIG. 4 shows a schematic flowchart.

FIG. 4 shows a schematic diagram 80 of the starting software and the control device 6. A driving mode 82 is not reached, within the scope of a cold boot according to the arrow 84, until after the blocks 86, 88, 90 and 92 have been run through. The block 86 represents a jump-in condition. The block 88 represents a boot block in which it is checked whether updating of the software by flashing is necessary and if a software update is necessary it is carried out. The block 90 represents a storage integrity test and serves to initialize the memory 5. The block 92 represents a test of the switch-off phase. During the driving mode 82, a software error is detected according to the circle 94. The detection of a software error can be triggered, for example, by the detection of a stack overflow, a running time check or by a comparison of results of redundantly executed algorithms. Of course, the driving mode 82 comprises both the normal mode 68 and the limp-home mode 70. If a software error is detected in the limp-home mode, the boosting of the steering force is switched off.

After the detection of a software error in the normal mode, the software is restarted within the scope of a soft boot. The soft boot is also referred to as a restart of the software. The soft boot comprises a start of the software when the hardware is ready for operation. Starting from the detection of the software error 94, the block 90 is run through according to the arrow 96 and the arrow 98. After the block 90 is run through, the system changes back into the driving mode 82 according to the arrow 100. The second time period T2 is shorter than the first time period T1 as a result of the blocks 86, 88 and 92 being omitted.

Figure 5:
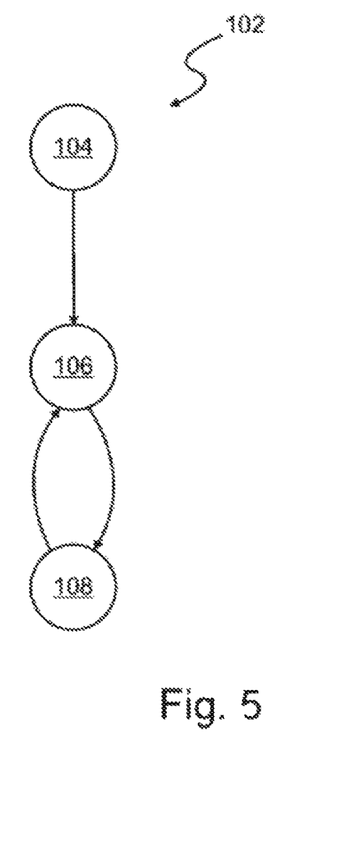
FIG. 5 and FIG. 6 each show a schematic state changeover diagram.

FIG. 5 shows a state transition diagram 102. In a state 104, the software is restarted according to a cold boot. The cold boot is also referred to as cold start and comprises both starting the hardware and starting the software after a powerless state of the hardware. After the starting of the software by means of the cold boot, the system changes into the driving mode according to a state 106. When a software error is detected, the system changes into the state 108 in which the software is restarted according to the soft boot during the second time period T2. After the restarting of the software by means of the soft boot, the system changes again into the driving mode according to the state 106. In contrast to FIG. 3, the diagram 102 does not comprise a limp-home mode.

Figure 6:
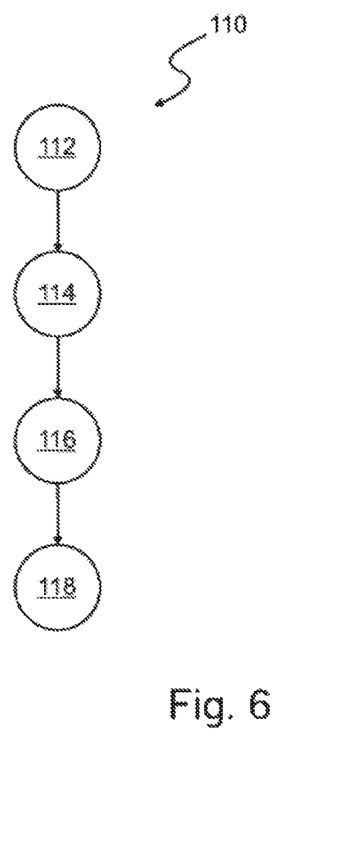

FIG. 6 shows a state transition diagram 110. In a state 112, the cold boot is carried out. After the starting of the software, the normal mode is carried out according to a state 114. When an error in the software is detected in the normal mode, the system changes into a state 116 in which the software is restarted according to the soft boot during the second time period T2. After the restart of the software, the system changes into a state 118 which corresponds to the limp-home mode.

The start of the software during the first time period T1 is the cold boot. The restarting of the software during the second time period T2 is the soft boot. The cold boot comprises a hardware integrity test and/or a software update check. The soft boot and the restart of the software comprise neither the hardware integrity test nor the software update check.

The invention claimed is:

1. A method for operating a steering system (2) of a motor vehicle having an electric drive unit (15) for boosting the steering force, the method comprising:
    operating an electric drive unit by a control device configured to execute software, and
    during a restart of the software, operating the electric drive unit (15) so that torque introduced via a steering device to a steering rack is damped by a torque generated by the electric drive unit.

2. The method as claimed in claim 1, wherein during the restart of the software, the electric drive unit (15) is operated as a function of a pulse-width-modulated signal in order to damp the torque which is introduced via the steering device.

3. The method as claimed in claim 2, wherein the pulse-width-modulated signal is generated a) as a function of a torque which is generated by the electric drive unit (15) before or during the detection of a faulty function of the software, b) as a function of a rotational speed of the electric drive unit (15) before or during the detection of the faulty function of the software, c) as a function of the torque generated by the steering device before or during the detection of the faulty function of the software, or d) as a combination of any of a), b), and c).

4. The method as claimed in claim 1, wherein during the restart of the software, at least two drive phases (60, 62; 62, 64; 64, 62) of the electric drive unit (15) are short-circuited in order to damp the torque which is introduced via the steering device.

5. The method as claimed in claim 4, wherein a closable switch (50, 52; 52, 54; 50, 54; 40, 42; 42, 44; 40, 44) is arranged between two drive phases (60, 62; 62, 64; 64, 62), and wherein the switch (40-54) is closed in order to short-circuit the two drive phases (60, 62; 62, 64; 64, 62) for the purpose of damping the torque introduced by the steering device.

6. The method as claimed in claim 5, wherein the closable switch (40-54) is opened or closed during a failure time period (T2) as a function of a pulse-width-modulated signal, as a function of a rising or falling edge of the pulse-width-modulated signal.

7. The method as claimed in claim 1, wherein during the restart of the software, damping of the torque which is introduced by the steering device is prevented if a rotational speed of the electric drive unit was above a threshold before the restart of the software.

8. The method as claimed in claim 1, wherein during a starting mode (84) of the steering system, the software is started during a first time period (T1), wherein during a driving mode (82) of the motor vehicle a faulty function of the software is detected, and wherein the restart of the software is carried out as a function of the detection of the faulty function of the software in such a way that a failure time period (T2) is shorter than the first time period (T1).

9. The method as claimed in claim 8, wherein the failure time period (T2) is shorter than or equal to 200 ms, and the first time period (T1) is longer than 200 ms, or wherein the failure time period (T2) is shorter than or equal to 300 ms, and the first time period (T1) is longer than 300 ms, or wherein the failure time period (T2) is less than or equal to 500 ms, and the first time period (T2) is longer than 500 ms.

10. The method as claimed in claim 1, wherein after the restart of the software, the system is changed to a limp-home mode (70), wherein the limp-home mode (70) has a smaller functional scope compared to a normal mode (68) carried out before the restart, and wherein the torque which is input into a steering linkage (21) by the electric drive unit (15) during the limp-home mode (70) is reduced compared to the normal mode (68) by a factor.

11. The method as claimed in claim 1, wherein a computing unit (3) for executing the software is monitored by means of a monitoring unit (32), and wherein the monitoring unit (32) is operated during a restart of the software in such a way that a probability that the monitoring unit (32) disconnects the electric drive unit (15), the computing unit (3), or both from a power supply (Vs) during a failure time period (T2) is reduced.

12. The method as claimed in claim 1, wherein during the restart of the software, the control device controls the electric drive unit to damp the torque introduced by the steering device by counteracting the torque introduced by the steering device.

13. A non-transitory, computer-readable storage medium storing instructions that, when executed by an electronic processor, are configured to carry out a method as claimed in claim 1.

14. A control device (6) for operating a steering system (4) of a motor vehicle which is provided with a digital computing device (3), the digital computing device configured to execute the non-transitory, computer-readable instructions as claimed in claim 13.

15. A steering system (4) of a motor vehicle which is designed to carry out a method as claimed in claim 1.

* * * * *